US010407051B2

(12) United States Patent
Sim et al.

(10) Patent No.: US 10,407,051 B2
(45) Date of Patent: Sep. 10, 2019

(54) APPARATUS AND METHOD FOR CONTROLLING DRIVING OF HYBRID VEHICLE

(71) Applicants: Hyundai Motor Company, Seoul (KR); Kia Motors Corporation, Seoul (KR)

(72) Inventors: Hong Kee Sim, Seoul (KR); Jung Soo Park, Seoul (KR); Jung Wook Kim, Gyeonggi-do (KR); Dong Ho Yang, Incheon (KR); Keum Jin Park, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 227 days.

(21) Appl. No.: 15/700,840

(22) Filed: Sep. 11, 2017

(65) Prior Publication Data

US 2018/0162357 A1    Jun. 14, 2018

(30) Foreign Application Priority Data

Dec. 12, 2016 (KR) ........................ 10-2016-0168783

(51) Int. Cl.
*B60W 20/13* (2016.01)
*B60W 20/20* (2016.01)
(Continued)

(52) U.S. Cl.
CPC ............ *B60W 20/13* (2016.01); *B60W 10/06* (2013.01); *B60W 10/26* (2013.01); *B60W 20/12* (2016.01);
(Continued)

(58) Field of Classification Search
CPC ...... B60W 20/13; B60W 20/12; B60W 10/06; B60W 10/26; B60W 20/20;
(Continued)

(56) References Cited

U.S. PATENT DOCUMENTS 6,131,680 A * 10/2000 Nii ......................... B60L 50/16
                                                        180/65.235
6,183,389 B1 * 2/2001 Tabata .................. B60K 6/365
                                                        477/174

(Continued)

FOREIGN PATENT DOCUMENTS

JP          09030295 A  *  2/1997
JP          4240048 B2     3/2009
(Continued)

*Primary Examiner* — Tuan C To
(74) *Attorney, Agent, or Firm* — Mintz Levin Cohn Ferris Glovsky and Popeo, P.C.; Peter F. Corless

(57) ABSTRACT

An apparatus and method for controlling driving of a hybrid vehicle are provided. The apparatus includes a state identifying unit that identifies a driving state of a vehicle based on driving information of the vehicle during lock-up driving of the vehicle and a determination unit that determines whether the identified driving state satisfies a preset lock-up charge driving mode entering condition and determines a deceleration volition of a driver based on the identified driving state. When the identified driving state satisfies the lock-up charge driving mode entering condition a driving controller interrupts the vehicle from entering into a lock-up charge driving mode when the driver has a deceleration intention.

20 Claims, 6 Drawing Sheets

(51) Int. Cl.
*B60W 50/10* (2012.01)
*B60W 50/14* (2012.01)
*B60W 10/06* (2006.01)
*B60W 30/18* (2012.01)
*B60W 50/00* (2006.01)
*B60W 10/26* (2006.01)
*B60W 20/12* (2016.01)

(52) U.S. Cl.
CPC ...... *B60W 20/20* (2013.01); *B60W 30/18072* (2013.01); *B60W 50/0097* (2013.01); *B60W 50/10* (2013.01); *B60W 50/14* (2013.01); *B60W 2510/1005* (2013.01); *B60W 2510/18* (2013.01); *B60W 2510/244* (2013.01); *B60W 2520/10* (2013.01); *B60W 2540/04* (2013.01); *B60W 2540/10* (2013.01); *B60W 2540/12* (2013.01); *B60W 2710/0666* (2013.01); *Y10S 903/93* (2013.01)

(58) Field of Classification Search
CPC ....... B60W 30/18072; B60W 50/0097; B60W 50/10; B60W 50/50; B60W 50/14; B60W 2510/1005; B60W 2510/18; B60W 2510/244; B60W 2520/10; B60W 2540/04; B60W 2540/10; B60W 2540/12; B60W 2710/0666

USPC ......................................................... 701/22
See application file for complete search history.

(56) References Cited

U.S. PATENT DOCUMENTS

| | | | |
|---|---|---|---|
| 6,569,059 B1* | 5/2003 | Ito | B60W 10/06 477/107 |
| 2011/0010063 A1* | 1/2011 | Ota | B60K 6/365 701/58 |
| 2013/0024090 A1 | 1/2013 | Minase et al. | |
| 2014/0074331 A1 | 3/2014 | Shin et al. | |
| 2014/0302964 A1* | 10/2014 | Kobayashi | B60K 6/48 477/5 |
| 2016/0009273 A1* | 1/2016 | Nagamine | F16H 61/0031 180/65.25 |
| 2017/0120919 A1* | 5/2017 | Schiele | B60W 10/06 |
| 2017/0144650 A1* | 5/2017 | Nagamiya | B60W 20/12 |
| 2018/0056976 A1* | 3/2018 | Kim | B60W 20/13 |
| 2018/0080552 A1* | 3/2018 | Iwasa | B60K 6/36 |
| 2018/0266549 A1* | 9/2018 | Tohta | F16H 45/02 |

FOREIGN PATENT DOCUMENTS

| | | | |
|---|---|---|---|
| JP | 2011202748 A | * | 10/2011 |
| JP | 2011207410 A | * | 10/2011 |
| JP | 5182449 B2 | | 4/2013 |
| KR | 101371476 B1 | | 3/2014 |

* cited by examiner

APPARATUS AND METHOD FOR CONTROLLING DRIVING OF HYBRID VEHICLE

CROSS-REFERENCE TO RELATED APPLICATION

This application is based on and claims the benefit of priority to Korean Patent Application No. 10-2016-0168783, filed on Dec. 12, 2016, in the Korean Intellectual Property Office, the disclosure of which is incorporated herein in its entirety by reference.

TECHNICAL FIELD

The present disclosure relates to an apparatus and a method for controlling driving of a hybrid vehicle, and more particularly, to an apparatus and method for controlling driving of a hybrid vehicle which improve engine efficiency and optimize engine fuel ration by optimizing a lock-up charge control condition of the hybrid vehicle.

BACKGROUND

In general, a power source of a hybrid vehicle includes an engine and a driving motor, and the motor supports an output of the engine through assistance of driving power and is charged when the driving power is insufficient. A transmission mounted electric device (TMED) system of the hybrid vehicle is a system that includes a clutch mounted between the engine and the motor, and transmits the power of the engine to the vehicle through the clutch when a torque required by the driver is high.

One of the core controls for improving a fuel ratio of the hybrid vehicle is to control the on and off states of the engine based on conditions, such as a road condition and a state of charge (SOC) of a battery, a vehicle speed, and, for example, may include a lock-up charge control. The lock-up charge control is a prediction control technology that refers to a requirement (e.g., an accelerator pedal sensor (APS) or a brake pedal sensor (BPS)) of the driver, such as a vehicle speed or a SOC, and a purpose of the lock-up charge is to reduce an amount of a non-driven loss fuel by defense of the SOC and frequent switching on/off of the engine.

In other words, when it is not determined that the driver intends to decelerate the vehicle, the lock-up charge control maintains the engine coupling for a specific time period to prevent frequent switching on/off of the engine. However, the prediction control cannot accurately predict all situations. Further, according to the lock-up charge control, an efficiency of the engine deteriorates as compared with a lock-up driving mode due to the operation point of the engine is low.

SUMMARY

The present disclosure provides an apparatus and a method for control driving of a hybrid vehicle, by which an efficiency of an engine may be improved and a fuel ratio of the engine may be optimized by optimizing a lock-up charge control condition of the hybrid vehicle. The technical objects of the present disclosure are not limited to the above-mentioned one, and the other unmentioned technical objects will become apparent to those skilled in the art from the following description.

In accordance with an aspect of the present disclosure, an apparatus for controlling driving of a hybrid vehicle may include a state identifying unit configured to identity a driving state of a vehicle based on driving information of the vehicle during lock-up driving of the vehicle, a determination unit configured to determine whether the identified driving state satisfies a preset lock-up charge driving mode entering condition and determine a deceleration intention of a driver based on the identified driving state, and a driving controller configured to, when the identified driving state satisfies the lock-up charge driving mode entering condition, interrupt the vehicle from entering into a lock-up charge driving mode in response to determining that the driver has a deceleration intention.

In accordance with another aspect of the present disclosure, a method for controlling driving of a hybrid vehicle may include identifying a driving state of a vehicle based on driving information of the vehicle during lock-up driving of the vehicle, determining whether the identified driving state satisfies a lock-up charge driving mode entering condition, determining a deceleration volition of a driver based on the identified driving state, and when the identified driving state satisfies the lock-up charge driving mode entering condition, interrupting the vehicle from entering into a lock-up charge driving mode if it is determined that the driver has a deceleration volition.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
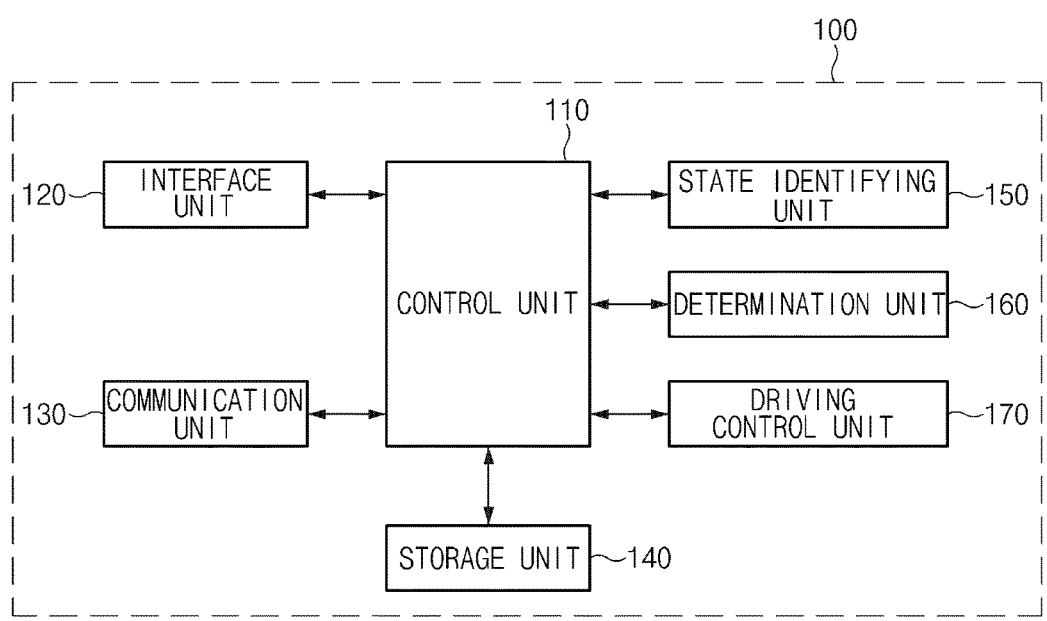
FIG. 1 is a block diagram illustrating a configuration of an apparatus for controlling driving of a hybrid vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/controller refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, control unit/controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings. Throughout the specification, it is noted that the same or like reference numerals denote the same or like components even though they are provided in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. The terms are provided only to distinguish the elements from other elements, and the essences, sequences, orders, and numbers of the elements are not limited by the terms. In addition, unless defined otherwise, all terms used herein, including technical or scientific terms, have the same meanings as those generally understood by those skilled in the art to which the present disclosure pertains. The terms defined in the generally used dictionaries should be construed as having the meanings that coincide with the meanings of the contexts of the related technologies, and should not be construed as ideal or excessively formal meanings unless clearly defined in the specification of the present disclosure.

FIG. 1 is a block diagram illustrating a configuration of an apparatus for controlling driving of a hybrid vehicle according to an exemplary embodiment of the present disclosure. The apparatus 100 for controlling driving of a hybrid vehicle according to the present disclosure may be embodied in the interior of the vehicle. Further, the apparatus 100 for controlling driving of a hybrid vehicle may be integrally formed with controllers mounted within the vehicle, and may be embodied as a separate apparatus to be connected to the controllers of the vehicle by a separate connection unit. In particular, the apparatus 100 for controlling driving of a hybrid vehicle may be operated in association with sensors, an engine, a motor, and the like mounted within the vehicle, and may be operated in association with a controller (e.g., a main controller) configured to operate the engine or the motor.

Accordingly, referring to FIG. 1, the apparatus 100 for controlling driving of a hybrid vehicle may include a controller 110, an interface unit 120, a communication unit 130, a storage unit 140, a state identifying unit 150, a determination unit 160, and a driving controller 170. In particular, the controller 110 may be configured to process signals delivered between the elements of the apparatus 100 to operate a hybrid vehicle. In other words, controller 110 may be configured to operate the other components of the apparatus.

The interface unit 120 may include an input unit configured to receive a control command from a driver, and an output unit configured to output an operation state and a result of the apparatus 100 for controlling driving of a hybrid vehicle. Particularly, the input unit may include a key button, and may include a mouse, a joystick, a jog shuttle, and a stylus pen. Further, the input unit may include a soft key that is embodied on a display. The output unit may include a display, and may include a voice output unit such as a speaker. When a touch sensor, such as a touch film, a touch sheet, a touch pad, is provided in the display, the display may be operated as a touch screen, and may be embodied in a form in which an input unit and an output unit are integrated.

The display may include at least one of a liquid crystal display (LCD), a thin film transistor-liquid crystal display (TFT-LCD), an organic light-emitting diode (OLED), a flexible display, a field emission display (FED), and a 3D display. Additionally, the communication unit 130 may include a communication module that supports a communication interface with electronic components, sensors, and/or controllers within the vehicle. For example, the communication module may be configured to receive driving information regarding the vehicle from the sensors mounted within the vehicle. In particular, the communication module may include a module that supports network communication of the vehicle, such as controller area network (CAN) communication, local interconnect network (LIN) communication, or Flex-Ray communication. Further, the communication module may include a module for wireless internet connection or a module for short range communication.

The storage unit 140 may be a memory configured to store data and/or algorithms necessary for operating the apparatus 100 for controlling driving of a hybrid vehicle. The storage unit 140 may specifically be configured to store driving information of the vehicle received via the communication unit 130, and may be configured to store condition information set to determine a driving mode of the vehicle based on the driving information of the vehicle. Further, the storage unit 140 may be configured to store commands and/or algorithms for determining a driving mode of the vehicle based on the driving information of the vehicle. In particular, the storage unit 140 may include storage media, such as a random access memory (RAM), a static random access memory (SRAM), a read-only memory (ROM), a programmable read-only memory (ROM), and an electrically erasable programmable read-only memory (EEPROM).

The state identifying unit 150 may be configured to identify or detect a driving state of the vehicle based on the driving information of the vehicle received via the communication unit 130. For example, the driving information of the vehicle may include gear stage information, vehicle speed information, brake state information, accelerator position sensor (APS) state information, E-coasting function setting information, and state of charge (SOC) information of a battery. The state identifying unit 150 may include a plurality of sensors configured to gather or obtain the driving information.

Additionally, the state identifying unit 150 may be configured to identify or detect driving state of the vehicle during lock-up driving of the vehicle. The determination unit 160 may be configured to determine a deceleration intention of the driver based on a driving state of the vehicle identified by the state identifying unit 150. First, the determination unit 160 may be configured to determine a driving state of the vehicle, identified by the state identifying unit 150, that is, determine whether a gear stage, a vehicle speed, a state of the brake satisfy a preset condition.

For example, the determination unit 160 may be configured to determine a gear stage during lock-up driving of the vehicle is a reference value (e.g., three-stage) or greater. Further, the determination unit 160 may be configured to determine a vehicle speed during lock-up driving of the vehicle is a reference speed (e.g., 25 KPH~200 KPH) or greater. The determination unit 160 may also be configured to determine whether the brake during lock-up driving of the vehicle is in an on state. In response to determining that the gear stage is the reference value or greater, the vehicle speed is the reference speed or greater, and the brake is in an on state during the lock-up driving of the vehicle, the determination unit 160 may be configured to determine a deceleration intention of the driver. Then, the determination unit 160 may be configured to determine the deceleration intention of the driver based on the state of the APS and the E-coasting setting state.

Inertial driving is a driving manner in which a vehicle is driven by not using a force of the engine but using a coasting force or an inertial force to minimize fuel consumption. The switching on of the E-coasting function indicates that the driving state of the vehicle satisfies a condition in which the inertial driving may be performed. For example, the E-coasting function may be switched on when an inertial driving distance is calculated based on a vehicle speed and a target vehicle speed and then it is determined that inertial driving is possible, by comparing a inertial driving allowable distance and a distance to a destination.

When the driver does not engage the accelerator pedal when the revolutions per minute (RPM) of the engine of the vehicle is a reference value or greater, the vehicle may be changed into a fuel cut state to perform inertial driving. When an off signal is generated in the APS while the vehicle is being driven, a driver intention for inertial driving may be determined.

Accordingly, the determination unit 160 may be configured to recognize an inertial driving intention of the driver to determine that the driver has no deceleration intention when the APS is an off state and the E-coasting function is in an on state. In particular, in response to determining by the determination unit 160 that the driver has no deceleration intention, the driving controller 170 may be configured to interrupt or prevent the vehicle from entering into a lock-up charge driving mode and may be configured to maintain the lock-up driving mode.

Meanwhile, the determination unit 160 may be configured to determine that the driver has a deceleration intention when the E-coasting function is in an off state even when the APS is an off state since the state is not an inertial driving allowable state. In particular, the determination unit 160 may be configured to determine whether the SOC of the battery satisfies a preset condition. For example, the determination unit 160 may be configured to determine whether the SOC of the battery is a reference SOC or greater. In response to determining that the SOC of the battery is a preset reference SOC or greater, the driving controller 170 may be configured to interrupt or prevent the vehicle from entering into the lock-up charge driving mode and maintain the lock-up driving state. In contrast, in response to determining that the SOC of the battery is less than a preset reference SOC, the driving controller 170 may be configured to operate the vehicle to enter into a lock-up charge driving mode.

Figure 2:
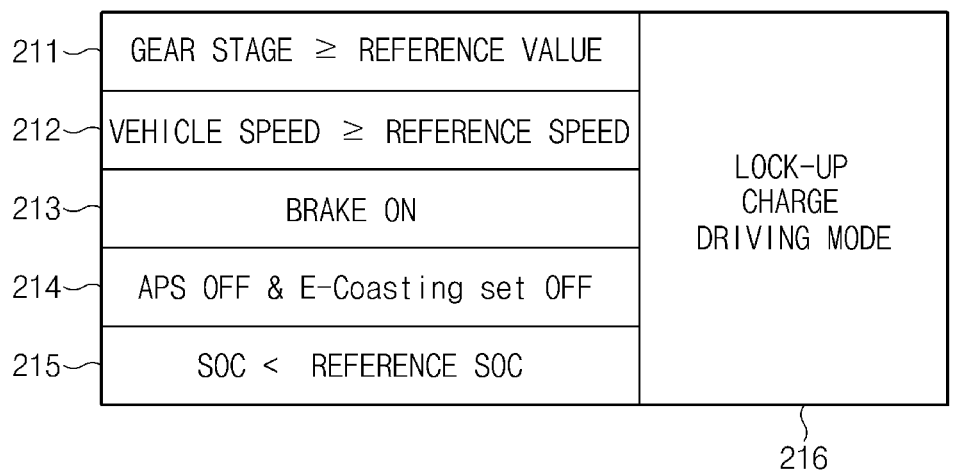
FIGS. 2 and 3A-3B are views illustrating an embodiment that is referenced to describe an operation of the apparatus for controlling driving of a hybrid vehicle according to an exemplary embodiment of the present disclosure.
Figure 3A:
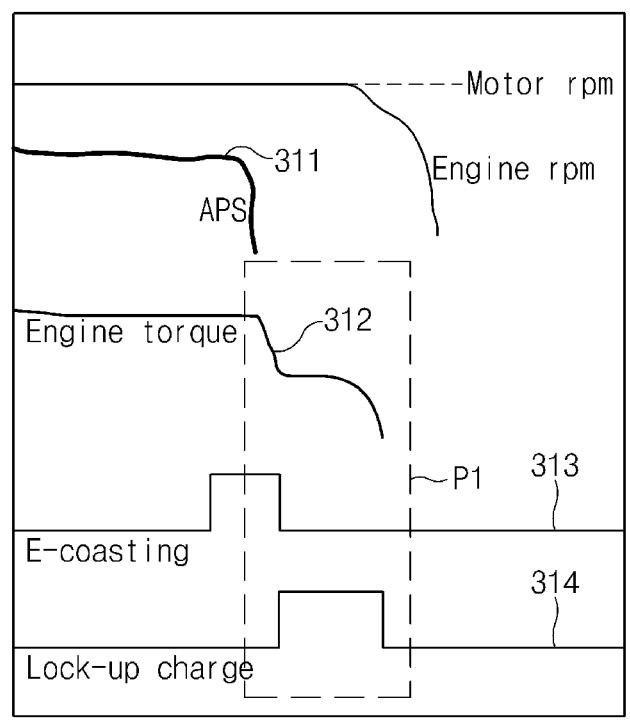
Figure 3B:
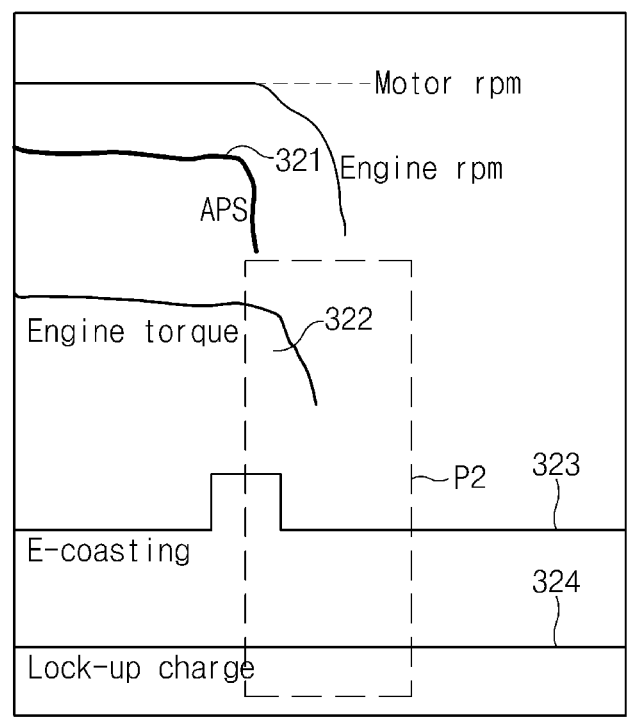

FIGS. 2 to 3B are views illustrating an exemplary embodiment to describe an operation of the apparatus for controlling driving of a hybrid vehicle according to an exemplary embodiment of the present disclosure. FIG. 2 illustrates a lock-up charge driving mode entering into condition of the vehicle.

As illustrated in FIG. 2, the lock-up charge driving mode for allowing the vehicle to enter into condition of the vehicle may be determined based on driving information collected while the vehicle is driven in the lock-up driving mode, for example, a gear stage, a vehicle speed, a state of the brake, a state of the APS, an E-coasting function setting state, and a SOC of the battery. Accordingly, the apparatus 100, operated by the controller 110, for controlling driving of the hybrid vehicle may be configured to operate the vehicle to enter into a lock-up charge driving mode 216, only when the gear stage, the vehicle speed, the state of the brake, the state of the APS, the E-coasting function setting state, and the SOC of the battery satisfy all the conditions of reference numerals 211 to 215 of FIG. 2.

Accordingly, the apparatus 100 for controlling driving of the hybrid vehicle may be configured to interrupt or prevent the vehicle from entering into a lock-up charge driving mode and maintain the lock-up driving state, when the gear stage, the vehicle speed, the state of the brake, the state of the APS, the E-coasting function setting state, and the SOC of the battery does not satisfy any one of the conditions of reference numerals 211 to 215 of FIG. 2.

In particular, the apparatus 100 may be configured to determine a deceleration intention of the driver based on the state of the APS and the E-coasting function setting state. Then, the apparatus 100 may be configured to interrupt or prevent the vehicle from entering into a lock-up charge driving mode and maintain a lock-up driving state in response to determining that the driver has no deceleration intention even though the other conditions of the lock-up charge driving mode entering conditions of the vehicle are satisfied. Accordingly, the apparatus 100 may be configured to interrupt or prevent the vehicle from entering into a lock-up charge driving mode by reflecting a deceleration volition of the driver, thereby preventing the engine from being frequently switched on and off and minimizing an amount of the non-driving loss fuel.

FIGS. 3A and 3B illustrates an exemplary embodiment of a state in which the vehicle enters into a lock-up charge driving mode according to an operation of the apparatus for controlling driving of a hybrid vehicle according to an exemplary embodiment of the present disclosure. First, FIG. 3A illustrates a driving control operation before the apparatus 100 for controlling driving of a hybrid vehicle according to the present disclosure is applied.

Referring to FIG. 3A, the hybrid vehicle reduces an engine torque 312 as in area P1 when a signal 311 of the APS is changed to an off state. In particular, the hybrid vehicle enters into a lock-up charge driving mode 314 to be driven as indicated by reference numeral 314. However, as the vehicle enters into the lock-up charge driving mode 314, the number of switching on/off of the engine increases and thus, the amount of the non-driving loss fuel also increases.

Meanwhile, FIG. 3B illustrates a driving control operation in which the apparatus 100 for controlling driving of a hybrid vehicle according to the present disclosure is applied. Referring to FIG. 3B, the hybrid vehicle reduces an engine torque 322 as in area P2 when a signal 321 of the APS is changed to an off state. Then, the apparatus 100 for controlling driving of a hybrid vehicle according to the present disclosure may be configured to detect a setting state 323 of the E-coasting function. In area P2, it may be identified that the setting state 323 of the E-coasting function is an on state. Accordingly, the apparatus 100 may be configured to determine a deceleration intention of the driver based on the state of the APS and the E-coasting function setting state. Accordingly, the apparatus 100 may be configured to interrupt or prevent the vehicle from entering into a lock-up charge driving mode as indicated by reference numeral 324.

Figure 4:
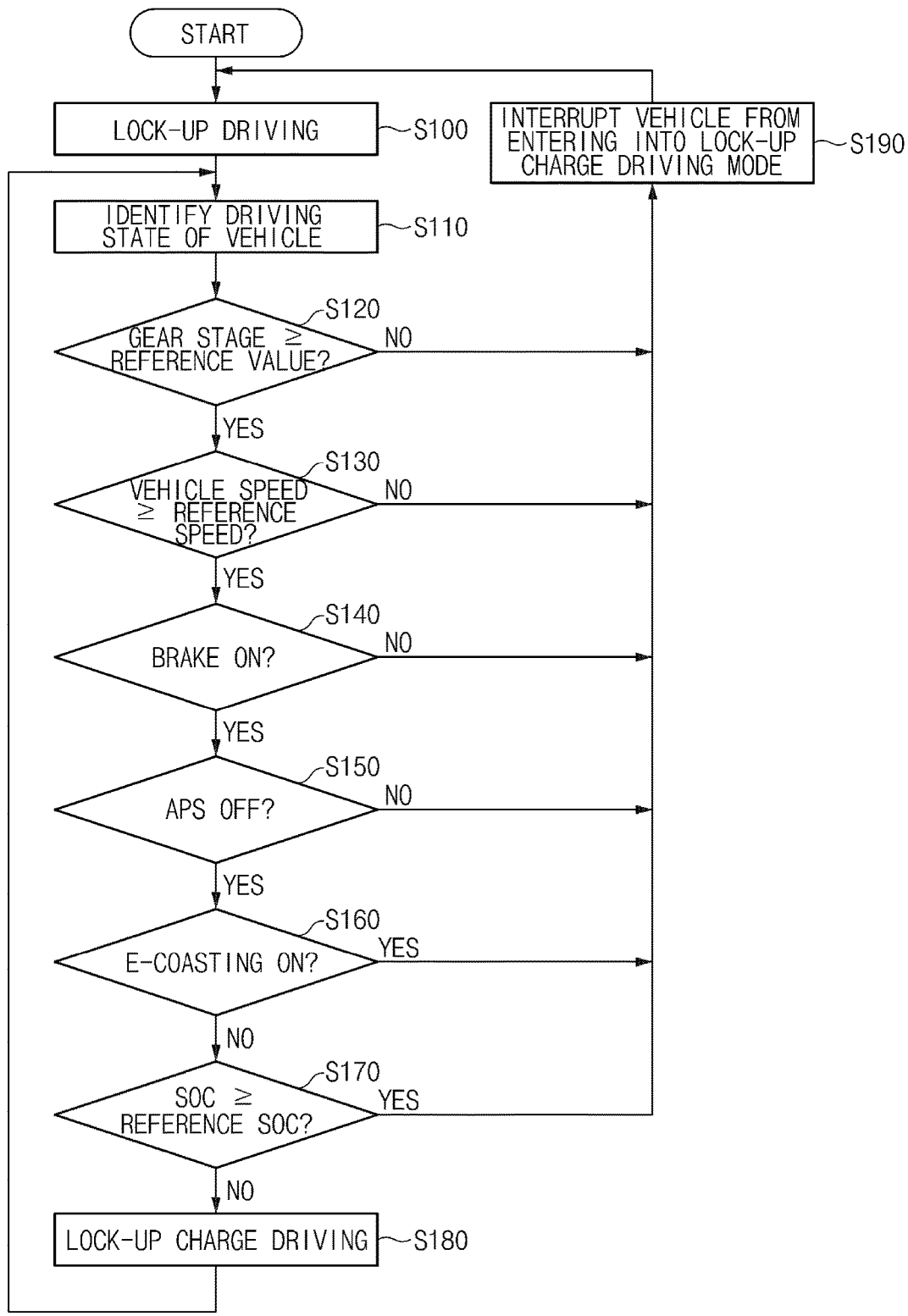
FIG. 4 is a flowchart illustrating an operation of a method for controlling driving of a hybrid vehicle according to an exemplary embodiment of the present disclosure.

An operational flow of the apparatus for controlling driving of a hybrid vehicle according to the present disclosure will be described in detail. FIG. 4 is a flowchart illustrating an operation of a method for controlling driving of a hybrid vehicle according to an exemplary embodiment of the present disclosure. The method to be described herein below may be executed by the controller 110.

As illustrated in FIG. 4, when the vehicle is driven in a lock-up state (S100), the apparatus 100 may be configured to identify a driving state of the vehicle based on driving information of the vehicle, for example, gear stage information, vehicle speed information, brake state information, APS state information, E-coasting function setting information, and SOC information of the battery (S110). Then, the apparatus 100 may be configured to determine whether the gear stage, the vehicle speed, and the state of the brake satisfy a preset condition based on the driving state identified in process S110 (S120 to S140).

For example, the apparatus 100 for controlling driving of a hybrid vehicle may be configured to determine whether the gear stage is a preset reference value or greater (S120), determine whether the vehicle speed is a preset reference value speed or greater (S130), and determine whether the brake is in an on state (S140). In response to determining in processes S120 to S140 that any one of the gear stage, the vehicle speed, and the state of the brake does not satisfy the preset conditions, the apparatus 100 may be configured to interrupt or prevent the vehicle from entering into a lock-charge driving mode (S180) and maintain the lock-up driving state (S100).

Meanwhile, in response to determining in processes S120 to S140 that the gear stage, the vehicle speed, and the state of the brake satisfy the preset conditions, the apparatus 100 may be configured to determine a deceleration intention of the driver based on the state of the APS and the E-coasting function setting state. Then, the apparatus 100 may be configured to determine that the driver has a deceleration intention when the APS is an off state (S150) and the E-coasting function is on (S160). In particular, the apparatus 100 may be configured to interrupt or prevent the vehicle from entering into a lock-up charge driving mode (S180), and maintain the lock-up driving state (S100). When the APS is in an off state and the E-coasting function is off in processes S150 and S160, the apparatus 100 may be configured to operate the vehicle such that the vehicle enters into a lock-up charge driving mode to be driven (S180) only when, after the SOC of the battery is identified, the SOC of the battery is a predefined reference SOC or less (S170).

Figure 5:
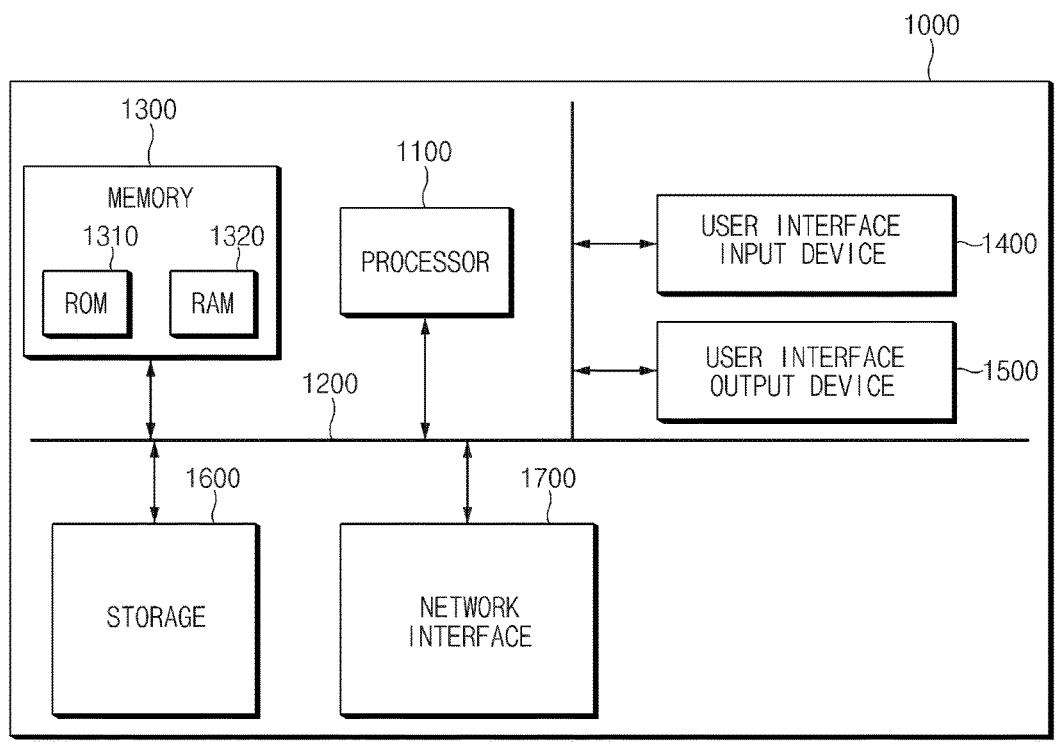
FIG. 5 is a block diagram illustrating a computing system that executes the method according to an exemplary embodiment of the present disclosure.

The apparatus 100 for controlling driving of a hybrid vehicle according to the exemplary embodiment of the present disclosure may be embodied in a form of an independent hardware apparatus and may be driven in a form in which the apparatus 100 is included in another hardware apparatus such as a microprocessor or a general-purpose computer system, as at least one processor. FIG. 5 is a block diagram illustrating a computing system that executes the method according to an exemplary embodiment of the present disclosure.

Referring to FIG. 5, the computing system 1000 may include at least one processor 1100 connected via a bus 1200, a memory 1300, a user interface input device 1400, a user interface output device 1500, a storage 1600, and a network interface 1700. The processor 1100 may be a central processing unit (CPU) or a semiconductor device that processes instructions stored in the memory 1300 and/or the storage 1600. The memory 1300 and the storage 1600 may include various volatile or nonvolatile storage media. For example, the memory 1300 may include a read only memory (ROM) and a random access memory (RAM).

Accordingly, the steps of the method or algorithm described in relation to the exemplary embodiments of the present disclosure may be implemented directly by hardware executed by the processor 1100, a software module, or a combination thereof. The software module may reside in a storage medium (that is, the memory 1300 and/or the storage 1600), such as a RAM memory, a flash memory, a ROM memory, an EPROM memory, an EEPROM memory, a register, a hard disk, a detachable disk, or a CD-ROM. The exemplary storage medium is coupled to the processor 1100, and the processor 1100 may read information from the storage medium and may write information in the storage medium.

In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component. According to the present disclosure, an efficiency of the engine may be enhanced and a fuel ratio of the engine may be optimized by optimizing a lock-up charge control condition of the hybrid vehicle.

The above description is a simple exemplification of the technical spirit of the present disclosure, and the present disclosure may be variously corrected and modified by those skilled in the art to which the present disclosure pertains without departing from the essential features of the present disclosure. Therefore, the disclosed exemplary embodiments of the present disclosure do not limit the technical spirit of the present disclosure but are illustrative, and the scope of the technical spirit of the present disclosure is not limited by the exemplary embodiments of the present disclosure. The scope of the present disclosure should be construed by the claims, and it will be understood that all the technical spirits within the equivalent range fall within the scope of the present disclosure.

What is claimed is:

1. An apparatus for controlling driving of a hybrid vehicle, comprising:
   a state identifying unit configured to identity a driving state of the vehicle based on driving information of the vehicle during lock-up driving of the vehicle;
   a determination unit configured to determine whether the identified driving state satisfies a preset lock-up charge driving mode entering condition and determine a deceleration intention of a driver based on the identified driving state; and
   a driving controller configured to, when the identified driving state satisfies the lock-up charge driving mode entering condition, interrupt the vehicle from entering into a lock-up charge driving mode in response to determining a driver deceleration intention.

2. The apparatus of claim 1, wherein the driving information of the vehicle includes a least one selected from the group consisting of: gear stage information, vehicle speed information, brake state information, accelerator position sensor (APS) state information, E-coasting function setting state information, and state of charge (SOC) information of a battery.

3. The apparatus of claim 2, wherein the determination unit is configured to determine whether a gear stage, a vehicle speed, and a state of the brake of the vehicle satisfy the lock-up charge driving mode entering condition.

4. The apparatus of claim 3, wherein when the gear stage of the vehicle is a reference value or greater, the vehicle speed is a reference speed or greater, and the brake is in an on state, the determination unit is configured to determine that the lock-up charge driving mode entering condition is satisfied.

5. The apparatus of claim 3, wherein in response to determining that the gear stage, the vehicle speed, and the state of the brake of the vehicle satisfies the lock-up charge driving mode entering condition, the determination unit is configured to determine the driver deceleration intention based on a APS state and an E-coasting function setting state of the vehicle.

6. The apparatus of claim 5, wherein when the APS of the vehicle is in an off state and the E-coasting function is in an on state, the determination unit is configured to determine the driver deceleration intention.

7. The apparatus of claim 5, wherein when the APS of the vehicle is in an off state and the E-coasting function is in an off state, the determination unit is configured to determine no deceleration intention.

8. The apparatus of claim 7, wherein in response to determining no deceleration intention, the determination unit is configured to determine whether a SOC of the battery of the vehicle satisfies the lock-up charge driving mode entering condition.

9. The apparatus of claim 8, wherein in response to determining that the identified driving state satisfies the lock-up charge driving mode entering condition and no deceleration intention, the driving controller is configured to operate the vehicle to enter into a lock-up charge mode.

10. The apparatus of claim 8, wherein when the SOC of the battery of the vehicle is less than a reference SOC, the determination unit is configured to determine that the lock-up charge driving mode entering condition is satisfied.

11. The apparatus of claim 8, wherein when the SOC of the battery of the vehicle is a reference SOC or greater, the determination unit is configured to interrupt the vehicle from entering into a lock-up charge driving mode of the vehicle.

12. A method for controlling driving of a hybrid vehicle, comprising:
    identifying, by a controller, a driving state of a vehicle based on driving information of the vehicle during lock-up driving of the vehicle;
    determining, by the controller, whether the identified driving state satisfies a lock-up charge driving mode entering condition;
    determining, by the controller, a driver deceleration intention based on the identified driving state; and
    when the identified driving state satisfies the lock-up charge driving mode entering condition, interrupting, by the controller, the vehicle from entering into a lock-up charge driving mode in response to determining the driver deceleration intention.

13. The method of claim 12, wherein the driving information of the vehicle includes at least one selected from the group consisting of: gear stage information, vehicle speed information, brake state information, accelerator position sensor (APS) state information, E-coasting function setting state information, and state of charge (SOC) information of a battery.

14. The method of claim 13, wherein the determining of whether the lock-up charge driving mode entering condition is satisfied includes:
    determining, by the controller, whether a gear stage, a vehicle speed, and a state of the brake of the vehicle satisfy the lock-up charge driving mode entering condition.

15. The method of claim 13, wherein the determining of the deceleration intention includes:
    in response to determining that the gear stage, the vehicle speed, and the state of the brake of the vehicle satisfies the lock-up charge driving mode entering condition, determining, by the controller, the driver deceleration intention based on a APS state and an E-coasting function setting state of the vehicle.

16. The method of claim 15, wherein the determining of the driver deceleration intention includes:
    when the APS of the vehicle is in an off state and the E-coasting function is in an on state, determining, by the controller, the driver deceleration intention.

17. The method of claim 15, wherein the determining of the driver deceleration intention includes:
    when the APS of the vehicle is in an off state and the E-coasting function is in an off state, determining, by the controller, no deceleration intention.

18. The method of claim 17, further comprising:
    in response to determining no deceleration intention, determining, by the controller, whether an SOC of the battery of the vehicle satisfies the lock-up charge driving mode entering condition.

19. The method of claim 18, further comprising:
    in response to determining that the identified driving state satisfies the lock-up charge driving mode entering condition and no deceleration intention, operating, by the controller, the vehicle to enter into a lock-up charge mode.

20. The method of claim 18, further comprising:
    when the SOC of the battery of the vehicle does not satisfy the lock-up charge driving mode entering condition, interrupting, by the controller, the vehicle from entering into a lock-up charge driving mode.

* * * * *